(12) United States Patent
Ware et al.

(10) Patent No.: US 6,914,193 B2
(45) Date of Patent: *Jul. 5, 2005

(54) SELF-SEALING ELECTRICAL CABLE HAVING A FINNED OR RIBBED STRUCTURE BETWEEN PROTECTIVE LAYERS

(75) Inventors: John Nicholas Ware, Villa Rica, GA (US); Stephen Lee Spruell, Carrollton, GA (US)

(73) Assignee: Southwire Company, Carrollton, GA (US)

( * ) Notice: Subject to any disclaimer, the term of this patent is extended or adjusted under 35 U.S.C. 154(b) by 179 days.

This patent is subject to a terminal disclaimer.

(21) Appl. No.: 10/235,024

(22) Filed: Sep. 4, 2002

(65) Prior Publication Data

US 2003/0062188 A1 Apr. 3, 2003

Related U.S. Application Data

(60) Continuation-in-part of application No. 09/730,661, filed on Dec. 6, 2000, now abandoned, which is a continuation-in-part of application No. 09/756,533, filed on Jan. 8, 2001, now Pat. No. 6,359,231, which is a division of application No. 09/228,482, filed on Jan. 11, 1999, now Pat. No. 6,184,473.

(51) Int. Cl.[7] .................................................. H01B 7/00
(52) U.S. Cl. ................................ 174/110 R; 174/113 R
(58) Field of Search ........................ 174/110 R, 113 R, 174/113 C, 115, 116, 120 R, 120 SR, 113 AS; 29/876; 156/47, 48, 51

(56) References Cited

U.S. PATENT DOCUMENTS

| | | | | |
|---|---|---|---|---|
| 2,583,025 A | * | 1/1952 | Swift et al. | 174/117 R |
| 2,583,026 A | * | 1/1952 | Swift | 174/117 R |
| 3,607,487 A | * | 9/1971 | Biskeborn et al. | 156/47 |
| 3,843,568 A | * | 10/1974 | Woodland et al. | 521/54 |
| 3,943,271 A | * | 3/1976 | Bahder et al. | 174/23 R |
| 4,360,704 A | * | 11/1982 | Madry | 174/36 |
| 4,435,613 A | * | 3/1984 | Gaubert | 174/102 SC |
| 4,563,540 A | * | 1/1986 | Bohannon et al. | 174/23 R |
| 4,832,443 A | * | 5/1989 | Cameron et al. | 385/101 |
| 5,512,625 A | * | 4/1996 | Butterbach et al. | 524/490 |
| 5,580,265 A | * | 12/1996 | Koblitz et al. | 439/276 |
| 5,898,044 A | * | 4/1999 | Nooren | 428/323 |
| 5,902,849 A | * | 5/1999 | Heucher et al. | 524/484 |
| 5,990,419 A | * | 11/1999 | Bogese, II | 174/120 R |
| 6,184,473 B1 | * | 2/2001 | Reece et al. | 174/110 R |
| 6,258,885 B1 | * | 7/2001 | Heucher et al. | 524/484 |
| 6,359,231 B2 | * | 3/2002 | Reece et al. | 174/110 R |
| 6,391,447 B1 | * | 5/2002 | Kornfeldt et al. | 428/396 |

* cited by examiner

*Primary Examiner*—William H. Mayo, III
(74) *Attorney, Agent, or Firm*—Smith, Gambrell & Russell LLP

(57) ABSTRACT

An electrical cable and a method for manufacturing the electrical cable are provided in which a plurality of insulated conductors have an inner protective layer extruded thereabout. A plurality of longitudinally extending ribs or fins or exterior ribbed or finned surfaces are formed outward of the inner protective layer between which exist a plurality of voids. An outer insulation layer can be formed in the same operation as the fins or ribbed surface and the inner layer or in a subsequent operation.

36 Claims, 10 Drawing Sheets

Fig_2

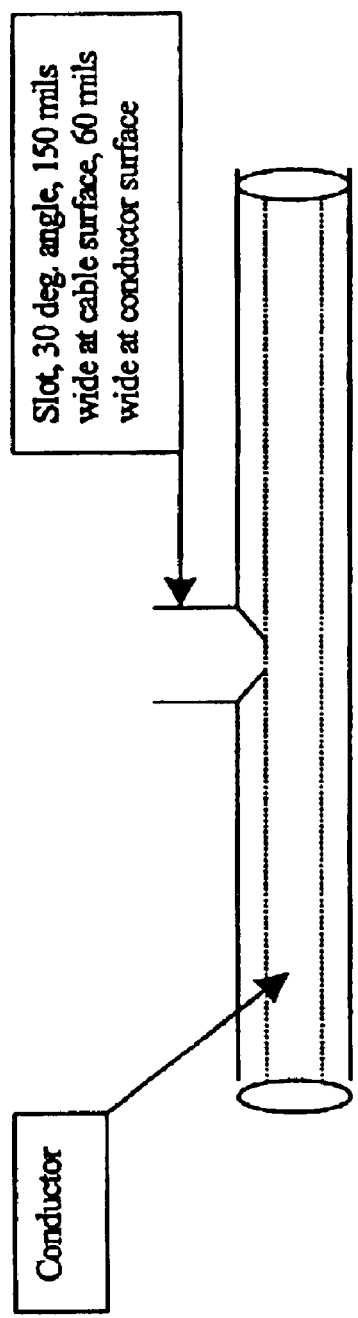
Figure 4: Insulation damage

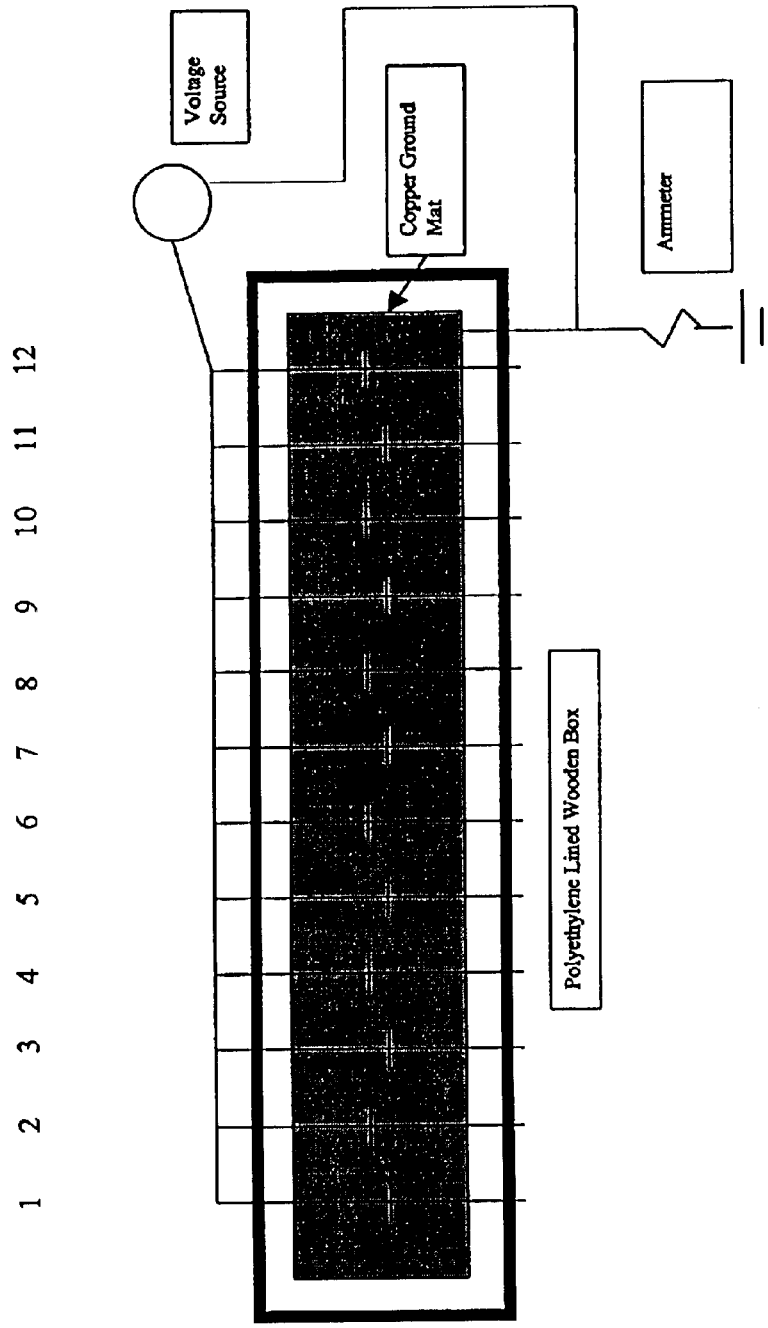
Figure 5: Sample layout in soil filled box
Damage Key: ——— slot damage
Samples 1-4 Control
Samples 5-12 Self-Sealing

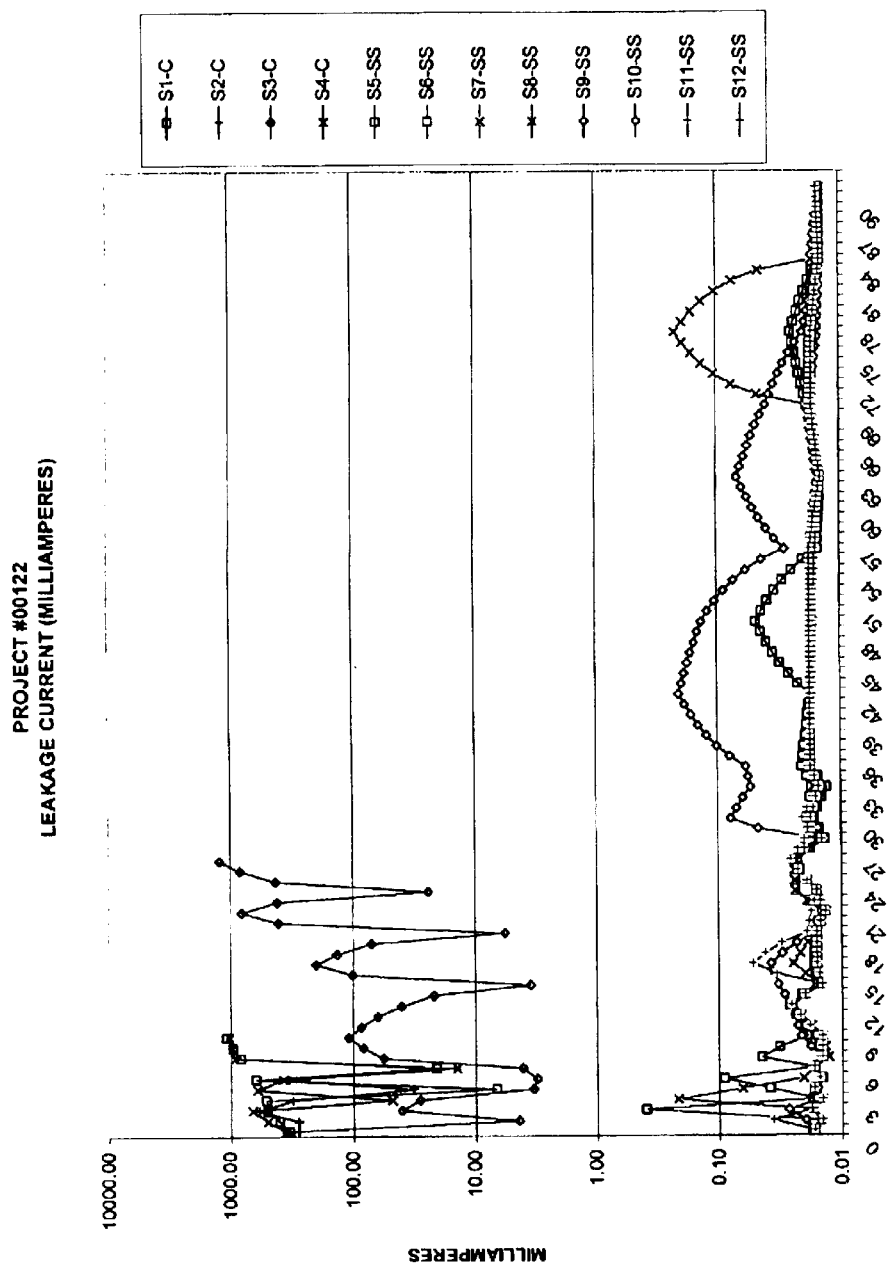
Figure 6. Cable Sample Leakage Current Measurements

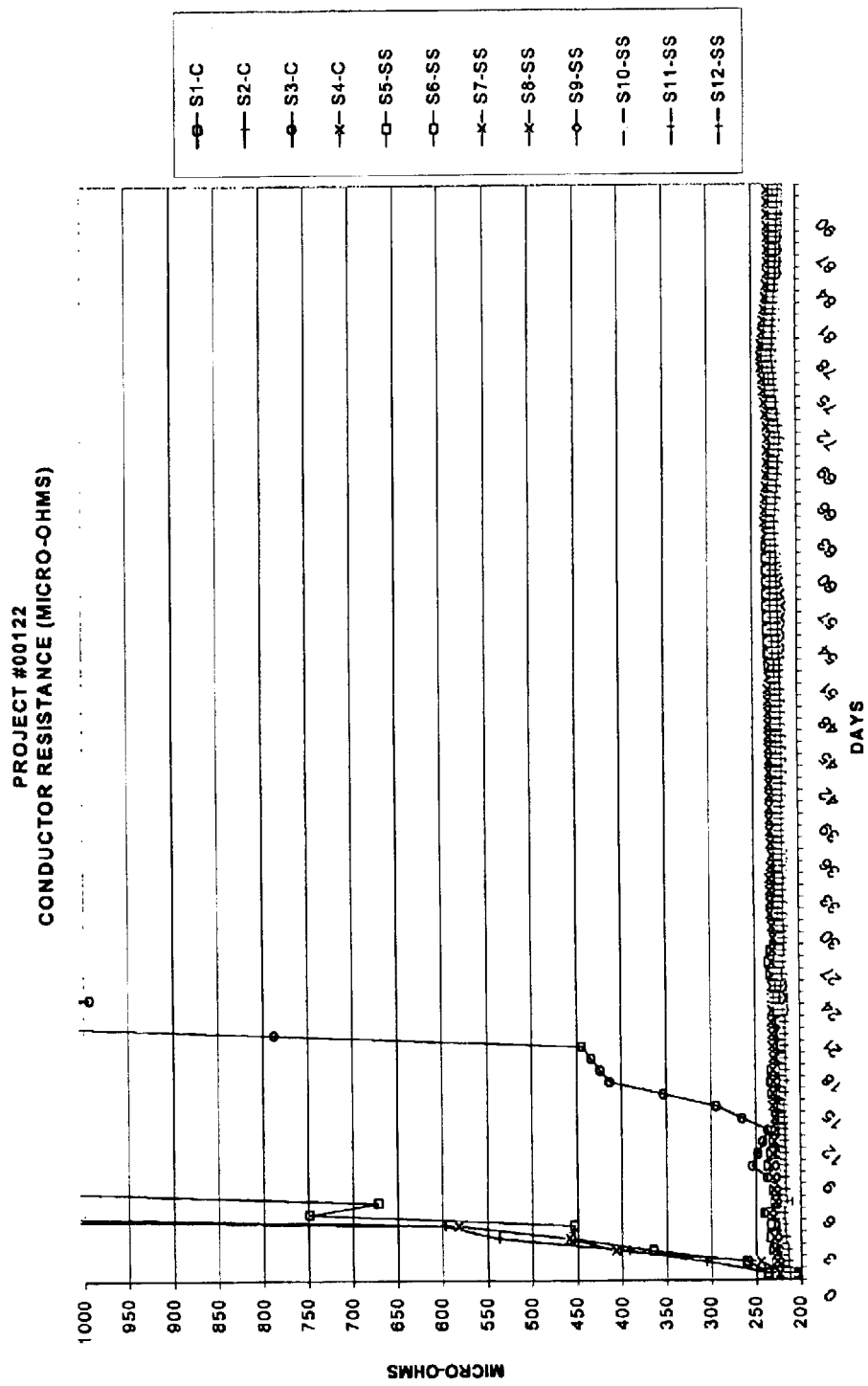
Figure 7: Cable Sample Conductor Resistance Measurements

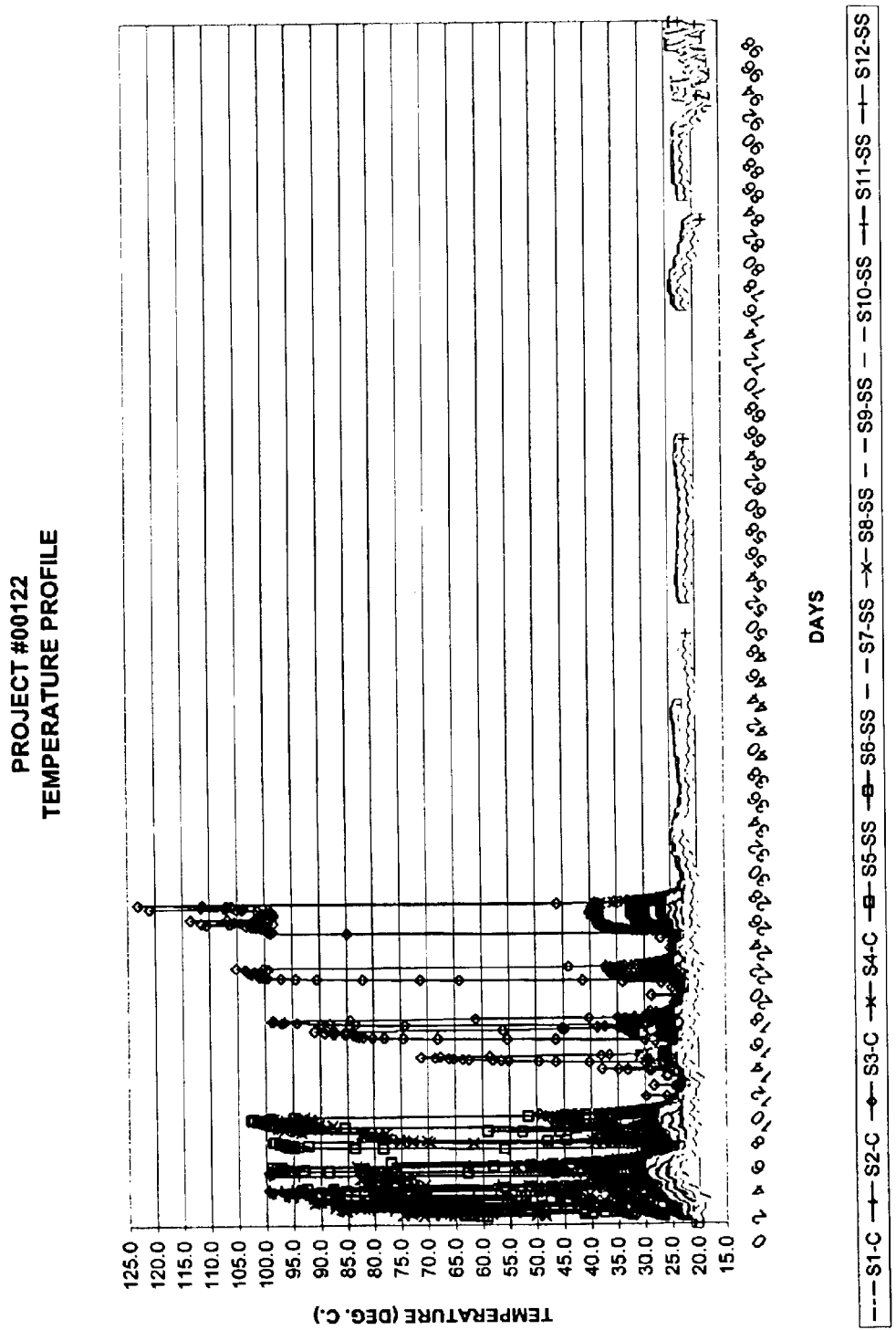
Figure 8: Cable Sample Temperature Measurements

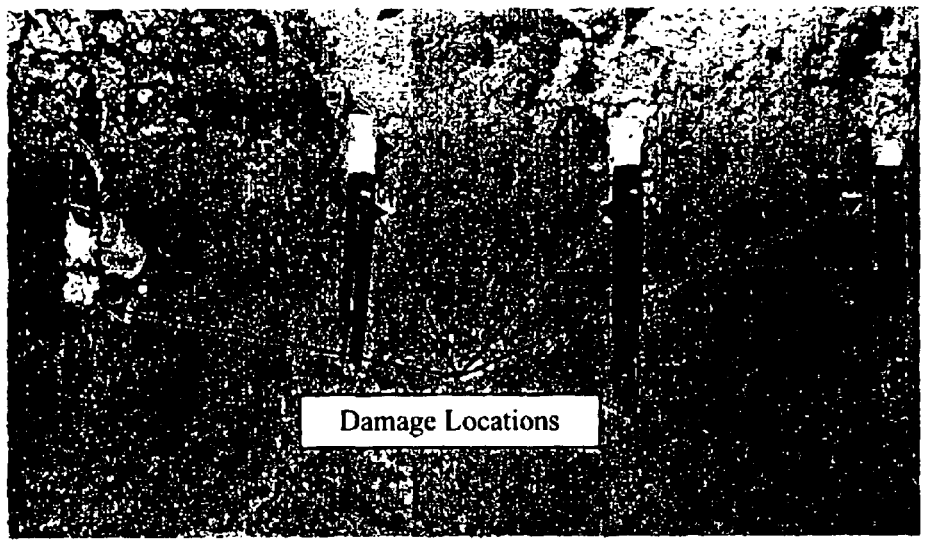
Figure 9: Left to Right - Sample 4 (Control) & Samples 5-7 (Self-Sealing) after 91 days in test
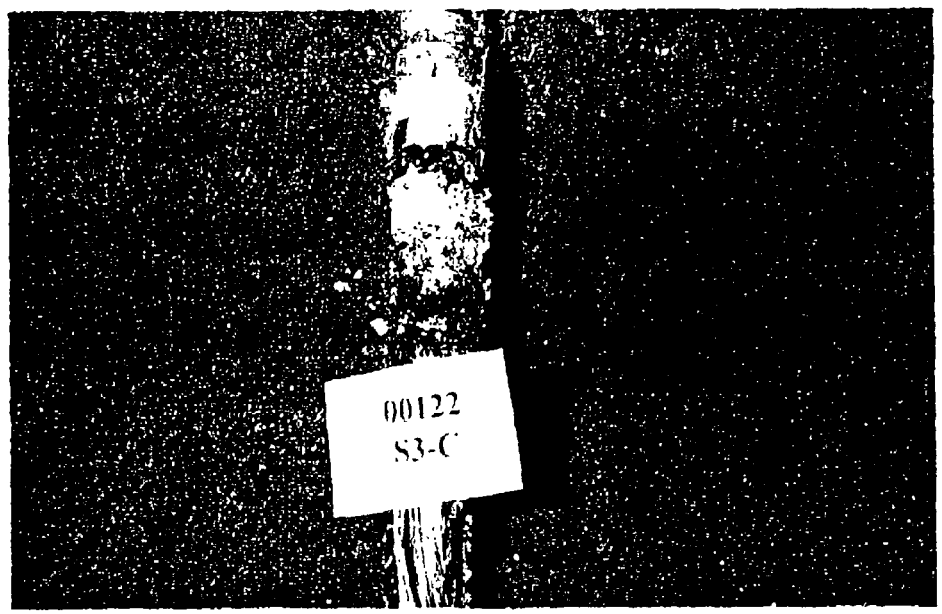
Figure 10  Sample 3 (Control) with significant corrosion after 91 days in test

Figure 11 Sample 8 (Self-Sealing) No visible corrosion after 91 days in test

SELF-SEALING ELECTRICAL CABLE HAVING A FINNED OR RIBBED STRUCTURE BETWEEN PROTECTIVE LAYERS

CROSS-REFERENCE TO RELATED APPLICATIONS

This application is a continuation-in-part of patent application Ser. No. 09/730,661 filed Dec. 6, 2000 now abandoned, which is a continuation-in-part of patent application Ser. No. 09/756,533 filed Jan. 8, 2001, now U.S. Pat. No. 6,359,231, which is a division of patent application Ser. No. 09/228,482 filed Jan. 11, 1999, now U.S. Pat. No. 6,184,473 which is relied on and incorporated by reference.

BACKGROUND OF THE INVENTION

Insulated solid and stranded electrical cables are well known in the art. Generally stranded cables include a central stranded conductor with a protecting insulation jacket disposed around the conductor.

The most frequent cause of failure of directly buried aluminum secondary cables is a cut or puncture in the insulation inflicted during or after installation. This leads to alternating current corrosion of the aluminum and finally to an open circuit. When a conductor is exposed to wet soil, upon damage, leakage current may flow, and cause localized electrochemical conversion of aluminum to hydrated aluminum oxide and eventually to an open circuit of the conductor.

In the U.S., thousands of such instances occur annually and the repair (location, excavation, repair, and replacement) can be very costly. As a result of the failures and in response to this problem, a tougher insulation system was introduced and became an industry standard. The tougher cable is described as "ruggedized," and generally consists of two layers: an inner layer of low density weight polyethylene and an outer layer of high density polyethylene. This design is more resistant to mechanical damage than one pass low density polyethylene, but still can result in exposure of the aluminum conductor if sufficient impact is involved.

Investigations show that AC electrolysis current can approach half-wave rectification when the current density is high. This accounts for the rapid loss of aluminum metal frequently experienced in the field. A caustic solution (pH 10–12) develops at the aluminum surface and dissolves the protective oxide film.

The mechanism of aluminum cable failure is the formation of hydrous aluminum oxide. As the aluminum oxide solids build up, the insulation in the vicinity of the puncture is forced to swell and splits open, making larger areas of the aluminum conductor surface available for electrolysis, thus increasing the leakage current and accelerating the corrosion process. Rapid loss of aluminum by AC electrolysis continues until ultimately the cable is open-circuited. A caustic environment is created at the aluminum, electrolyte interface, which dissolves the protective oxide film.

The ruggedized or abuse resistant type insulation was supposed to protect the cable from physical abuse. While it helped this problem, it did not eliminate 600 V cable failures. Utilities have recently reported varying numbers of 600 V aluminum underground distribution cable failure rates scattered between 70 and 7000 per year. Failures are evidenced by an open circuit condition accompanied by severe corrosion of the aluminum conductor.

All the reasons for 600 V failures are unknown, but several have been postulated by cable users. These cables seem to experience a high degree of infant mortality, followed by failures occurring over decades. The infant mortalities are usually directly related to damage caused by adjacent utilities, damage inflicted by landscaping and planting, or damage to the cable prior to or during installation. The failures occurring years later are harder to explain. There have been postulations of lightning damage, manufacturing defects, or insulation degradation over the life of the installation.

In order to better understand the insulation characteristics, studies of the AC breakdown, and DC impulse breakdown were conducted. AC breakdown studies on several different cables showed a high safety margin of performance. Each of these cables had a 0.080 inch wall thickness. Tests were conducted in water filled conduits. The AC breakdown strength of all of these cables was consistently above 20 kV, far in excess of the operating stress.

Impulse breakdown studies have also been performed on several 600 V cable constructions having different insulation formulations. The impulse breakdown level of these cables was approximately 150 kV. This exceeds the BIL requirements of a 15 kV cable system and should well exceed the impulses on 600 V secondary cables during operation.

The above margins of electrical performance were measured on new cables. They are far above what is needed to operate on a 600 V system since most of these cables operate at 120 V to ground. One of the tests during compound and product development is a long term insulation resistance test performed in water at the rated operating temperature of the insulation. For crosslinked polyethylene cables the water temperature is 90° C. The insulation resistance must demonstrate stability and be above minimum values for a minimum of twelve weeks. If there is instability indicated, the test is continued indefinitely. Relative permitivity is measured at 80 v/mil and must meet specific values. Increase in capacitance and dissipation factor are also measured in 90° C. water over a 14 day period. Insulation compounds used in present day cables easily meet these requirements.

Manufacturing defects in cable insulation are found during production by either of two methods. During the extrusion process, the cable is sent through a spark tester, where 28 kV DC, or 17 kV AC, is applied to the insulation surface. Any manufacturing defect resulting in a hole in the insulation will initiate a discharge, which is detected by the spark tester. Most manufacturers use this method. Another test that is also often employed is a full reel water immersion test. In this test 21 kV DC, or 7 kV AC is applied to the cable after immersion for 1 hour or 6 hours, depending on whether the cable is a plexed assembly or single conductor, respectively. The actual voltages used for these tests are dependent on the wall thickness. The above values are for an 0.080 inch wall.

The above testing has demonstrated electrical performance that is stable and far surpasses the requirements of the installation for 600 V cable. This does not explain a sudden cable failure after many years of operation. Such sudden failure can be explained by a better understanding of the failure mechanism. Aluminum corrosion in the presence of an alternating leakage current is a combination of two different mechanisms. Aluminum is normally afforded a great deal of corrosion protection by a relatively thin barrier layer of aluminum oxide, and a more permeable bulk layer of oxide. However, flaws or cracks exist in these layers which provides a spot for the corrosion reaction to begin. The metal in contact with water undergoes an anodic (positive ions moving into solution) and a cathodic cycle, sixty times per second.

During the anodic half cycle of leakage current, aluminum ions leave the metallic surface through these flaws and combine with hydroxyl ions in the water surrounding the cable. This reaction results in pitting of the metal and the formation of aluminum hydroxide, the whitish powder evident in corroded cables. Another important reaction also occurs. The hydroxyl ions are attracted to the metal surface during this half cycle, which increases the pH, causing a caustic deterioration of the oxide layer, further exposing more aluminum.

During the cathodic half cycle another reaction occurs. Hydrogen ions are driven to the aluminum surface. Instead of neutralizing the caustic hydroxyl concentration, the hydrogen ions combine and form hydrogen gas, which leaves the cable. The hydrogen depletion has the effect of further concentrating the caustic hydroxyl ions, thus furthering the deterioration of the surface oxide. No pitting occurs during this half cycle since the aluminum ion is attracted to the metal. A caustic solution develops, hydrogen evolves, aluminum pitting takes place, and aluminum hydroxide forms during this reaction.

A critical current density is necessary to sustain the corrosion reaction. Below this current density corrosion will be very slight, or almost imperceptible. Once the current density is high enough, the reaction can be swift. The necessary current density is below 1 $mA/in^2$. The current density of a damaged 600 V cable is influenced by the voltage, leakage resistance, and the area of exposed metal. Variables affecting this can include dampness of the soil, chemistry of the soil, degree of damage, etc.

DESCRIPTION OF THE RELATED ART

The toughest cables on the market today will not always stand up to the rigors of handling, installation, and operation. And exposed aluminum will eventually deteriorate. The solution, then, is to find a way to economically prevent the corrosion process.

Attempts have been made to prevent the ingress of moisture by introducing a sealant between the strands of the conductor and between the conductor and the insulation. See U.S. Pat. Nos. 3,943,271 and 4,130,450. However, it has been found that the mere introduction of a sealant into such spaces is not entirely satisfactory. Attempts to prevent moisture from reaching the conductor, such as using water swellable material, have not met with technical and/or economic success. For example, voids may be formed in the sealant during the application thereof or may be formed if the cable is accidentally punctured. Any such spaces or voids form locations for the ingress of moisture which can lead to corrosion of the conductor and conventional sealants used in the cables cannot eliminate such voids.

A prior art attempt to minimize the flow of moisture or water within the interstitial spaces of a stranded conductor came in the form of compacted or compressed stranded conductors. The stranded conductor itself was radially crushed in order to reduce the diameter of the conductor and to fill the interstitial spacing with metal from the individual wires themselves. The drawback to this method is that even though some deformation of the individual wires does take place, and some of the interstitial spacing is filled, there is still the possibility of cable insulation damage through which moisture can enter the cable and contact the conductor.

Another attempt at correcting moisture flowing within interstitial space consisted of filling the interstitial space with a foreign substance which physically prevented the flow of the moisture or water within the conductor structure. These substances typically comprised some type of jelly base and a polyethylene filler material. At slightly elevated temperatures, this compound becomes fluid and viscous and can be applied as the conductor is being formed. The individual wires used to form the conductor are fed into an extrusion die where the moisture blocking compound is extruded onto and around each individual wire and, as the wires are stranded into the conductor, the interstitial space is filled with the jelly-like material. Upon cooling, the filler becomes very stable and immobile and does not flow out of the interstitial spaces of the stranded conductor. Once the filling compound is applied within the interstitial spaces of the stranded conductor, it tends to remain in place. The problems encountered in applying such a filling substance revolve around precise metering of the material into the interstitial spaces as the stranded conductor is being formed. If too much material is extruded into the conductor, the outer insulation will not fit properly. If too little material is applied, the interstitial spaces will not be filled and therefore will allow moisture to flow within the conductor.

Another drawback to this method of applying a moisture blocking material is that an extrusion head and an extrusion pump for applying the material is required for every individual layer of wires used to form the conductor. The problems described above regarding the regulation of the volume of material applied through an extrusion head are multiplied every time an additional extrusion pump and extrusion head is required within the conductor manufacturing system. Prior art efforts to manufacture an acceptable moisture blocked conductor revolved around methods for uniform application of the moisture blocking material to the conductor, but did not solve the problems created by handling and installation damage.

Applications of moisture blocking material to the spacing of concentric lay conductors is known within the industry. This can be found in U.S. Pat. Nos. 3,607,487; 3,889,455; 4,105,485; 4,129,466; 4,435,613; 4,563,540; and 4,273,597.

U.S. Pat. No. 4,273,597 shows a method of strand filling the interstitial spacing of a conductor with a powder. This is accomplished by passing the strands through a fluidized powder bed, where the interstitial spacing is filled with the powder. The stranded conductor then exits the opposite end of the bed where an insulating layer is applied which prevents the powder from vacating the interstitial spacing of the conductor.

U.S. Pat. No. 4,563,540 describes a conductor which is constructed by flooding a waterproofing material among the individual conductors which make up the core of the stranded conductor. This flooded core is then wrapped with a plurality of different layers of shielding material which prevents the influx of moisture into the stranded conductor.

U.S. Pat. No. 4,435,613 describes a conductor constructed of a plurality of layers of insulating material with the core (or conducting portion) of the conductor being filled with an insulating layer of polyethylene. This polyethylene layer is contained by other rubber and plastic and epoxy compounds which produce a conductor having a waterproof construction.

U.S. Pat. No. 4,129,466 deals with a method for the application of the filling medium which is applied to a stranded conductor. This method comprises a chamber into which are passed individual wires that will be used to form the stranded conductor. These wires have a filling medium applied to them in the chamber. After the application of this filling medium, the conductor is passed through a chilling chamber where the filling medium is cooled and allowed to solidify within the interstitial spaces. This method requires that the chamber containing the filling medium and the stranded conductor be both heated and pressurized. The heat applied to the chamber reduces the viscosity of the filling material, while the pressure assures introduction of the material into the interstitial spaces of the stranded conductor.

U.S. Pat. No. 4,105,485 deals with the apparatus utilized in the '466 method patent previously discussed.

U.S. Pat. No. 3,889,455 discloses a method and apparatus for filling the interstitial spacing of the stranded conductor in a high temperature flooding tank. The individual wires are fed into a tank containing the filling material, the material having been heated to allow it to become less viscous. The individual wires are stranded and closed within the confines of the flooding tank and the finished conductor is withdrawn from the opposite end of the flooding tank where it is passed through a cooling means. The disadvantages experienced here involve the practice of stranding the conductor beneath the surface of an elevated temperature moisture block pool. No access, either visual or mechanical, to the conductor manufacturing process is practical.

U.S. Pat. No. 3,607,487 describes a method whereby individual strands of wire are fed into a flooding tank which is supplied with heated filling material by a pump and an injection means. The stranded conductor is withdrawn through the opposite end of the flooding tank, wiped in a wiping die, wrapped in a core wrapper and then passed through a binder where it is bound. The bound, wrapped core is then passed through a cooler which sets the filling material. The above described process is repeated through another flooding tank, another cooler, another binding machine, another flooding tank, another extruder, another cooling trough, and is eventually withdrawn from the end of the manufacturing line as a product having a plurality of layers of moisture blocking compound which protects the conductor core. The disadvantages here comprise a complex manufacturing line whereby moisture blocking material is applied at many different locations, each having to be meticulously monitored and controlled in order for a proper conductor construction to be obtained.

It can be readily seen from the above referenced methods and apparatuses that moisture blocked conductors are known and it can also be recognized that there are major problems concerning the elimination of moisture contacting the conductor as a result of handling and installation of a cable.

BRIEF SUMMARY OF THE INVENTION

The present invention relates to improvements in insulated solid and stranded cables. An electrical cable and a method for manufacturing the electrical cable are provided in which a plurality of insulated conductors have an inner protective layer extruded thereabout, and outwardly extending ribs, or an exterior ribbed or finned surface, which includes a plurality of longitudinally extending ribs or fins between which exist a plurality of voids. An outer insulation layer may be formed in the same operation as the inner layer or ribs or in a subsequent operation. In a two-pass manufacturing process for the present cable, the first pass involves extruding the inner finned layer onto the conductor. The inner layer can be polyethylene, pvc, or another suitable plastic material. The inner layer can be cross-linked while it is being applied or batch cross-linked after it is applied. The second pass involves using a hot melt pumping system to apply the sealant layer. This system advantageously consists of a Nordson model 550 drum melter which delivers sealant to a CH-440 head through which the cable passes. Other methods of pumping sealant, applying sealant, and sizing the sealant layer can be used depending on process or product requirements. The sealant can be applied over a wide range of temperatures. Good results are obtained by applying the sealant at about 175 degrees Fahrenheit. The outer encapsulating layer is then applied after the sealant layer, downstream from the sealant head. The outer layer can be polyethylene, pvc or another suitable plastic material. The outer layer can be cross-linked while it is being applied or afterwards in a batch process.

In a single pass manufacturing process, the conductor is fed into a head that consists of 3 zones. The inner finned layer is applied in the first zone. In the second zone the sealant layer is applied. The outer encapsulating layer is applied in the third zone. This process requires close control of the sealant temperature. The sealant must be applied cold enough to be able to remove enough heat to help set the finned layer. This avoids damage to the fins when the outer encapsulating layer is applied in the third zone. The sealant must not be applied too cold or it will prevent even distribution of the sealant in the fins or cause fin damage. The optimal sealant application temperature is from about 80 to about 150 degrees Fahrenheit.

In one embodiment of the invention, during manufacture of the self-sealing cable, a material which provides the cable with puncture, crack, and void self-sealing properties is included between the ribs or fins and the outer insulation. The voids are at least partly filled by the material which will flow into any void, puncture, or crack formed in the insulation, thus preventing migration of moisture. The self-sealing material is applied in the voids between the ribs or fins and the outer insulation, therefore the self-sealing material does not contact the conductor.

BRIEF DESCRIPTION OF THE DRAWINGS

The objects and advantages of the invention will be apparent from the following detailed description of the preferred embodiments thereof in conjunction with the accompanying drawings in which:

FIG. 4 is a diagrammatic representation showing insulation damage.

FIG. 5 depicts the soil-filled box used to determine current leakage in a damaged cable.

FIG. 6 is a graph of sample leakage current measurements.

FIG. 7 is a graph of conductor resistance measurements.

FIG. 8 is a graph of sample temperature measurements.

FIG. 9 is a comparison of samples of the invention and a control after 91 days in the test.

FIG. 10 is a close-up of the control sample after 91 days in the test.

FIG. 11 is a close-up of the test sample of the present invention after 91 days in the test.

DETAILED DESCRIPTION IN THE INVENTION

Although the principles of the present invention are applicable to different types of electric cables, the invention will be described in connection with a known cable structure, such as a 600 volt cable, which normally comprises, as a minimum:

(1) A central conductor of stranded wires of a good conductivity metal such as copper, aluminum, copper alloys or aluminum alloys; and (2) A layer of insulation around the stranded conductors which has been extruded thereover.

Figure 1:
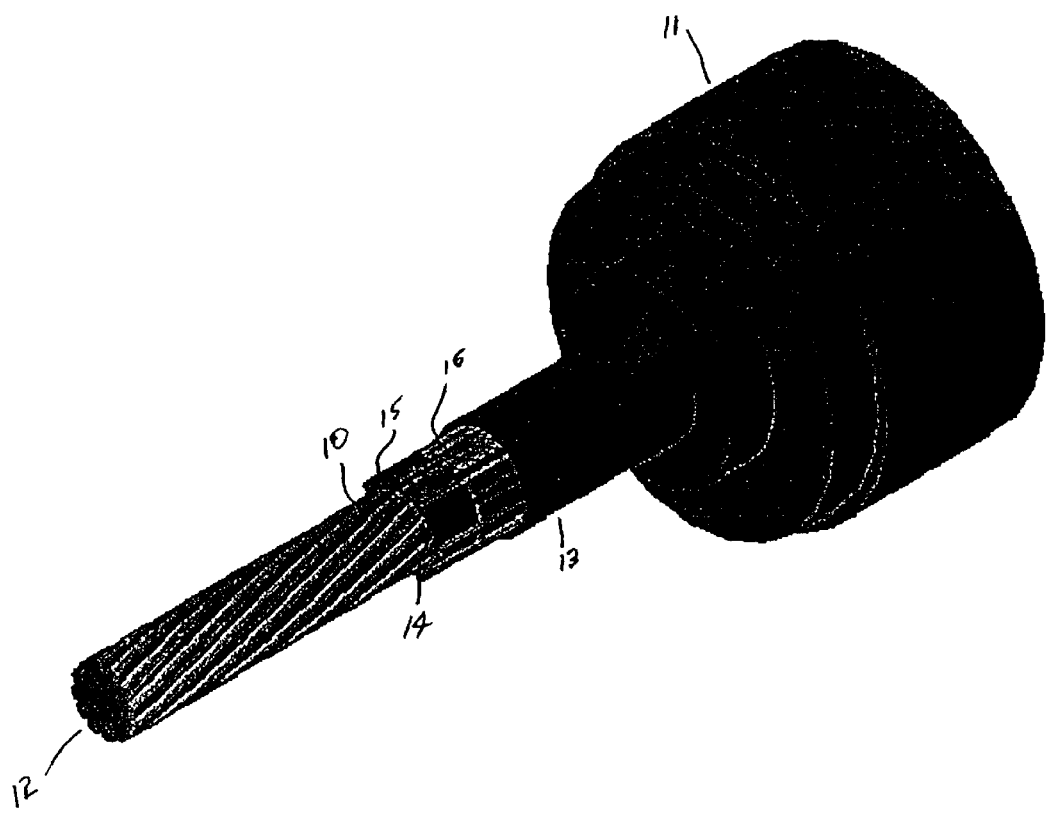
FIG. 1 is a cut-away, perspective view of a cable of the invention showing a stranded conductor, the finned inner layer surrounding the conductor, the insulation, and the area between the fins containing the material which provides the self-sealing effect.

FIG. 1 shows a cable 11 comprising a conductor 12 of stranded wires of copper or aluminum or alloys thereof. An inner layer 14 encircles cable 11. A plurality of longitudinally extending fins or ribs 15 are formed between which extend a plurality of voids 16. A layer 10 of material which provides the self-sealing effect is applied in and at least partly fills voids 16 between ribs 15, inner layer 14, and an outer insulation jacket 13. Insulation jacket 13 is of known material and is preferably an extruded polymeric material.

Preferred material 10 comprises a polymer which can be readily pumped at temperatures at least as low as 25° C. Preferably, the polymer will be a low molecular weight polymer such as low molecular weight isomer. Other materials, or combinations of materials, with or without such polymers, having such characteristics may also be useful in the present invention. A polymer which has been found to be particularly suitable is polyisobutene.

The preferred polymer of the present invention has very little or no significant Shore A hardness. A test of determining whether or not the polymer has acceptable properties is the Penetrometer Test incorporated in ASTM D5 Penetration of Bituminous Materials. The 100 grams needle penetration value at 25° C. should be greater than about 100 tenths of a millimeter.

The material used to provide the self-sealing effect to the electric cable of the present invention has the following properties:

(a) The material is substantially insoluble in water;

(b) The material is a dielectric, i.e., it is non-conductive and is not a semi-conductor;

(c) The material causes the cable to be self-sealing, i.e., it will flow, at ambient temperature, into insulation voids and/or cracks and prevent contact between the conductor and moisture which could cause cable failure; and (d) The material does not absorb moisture or swell upon contact with moisture.

In the preferred embodiment of the present invention, the material used to at least partly fill voids 16 is a compound of a low molecular weight isomer or a low molecular weight copolymer of an isomer. Preferably, the material is polyisobutene. Advantageously there is little or no air present between voids 16 and insulation jacket 13.

The material of the present invention may optionally contain filler material, but is essentially free of any solvents or oils.

The cable 11 described in connection with FIG. 1 can be used without further layers encircling the insulation jacket 13.

Also, in other embodiments of the present invention described herein, the conductor and layers of insulation can be the same as those described in connection with FIG. 1.

Figure 2:
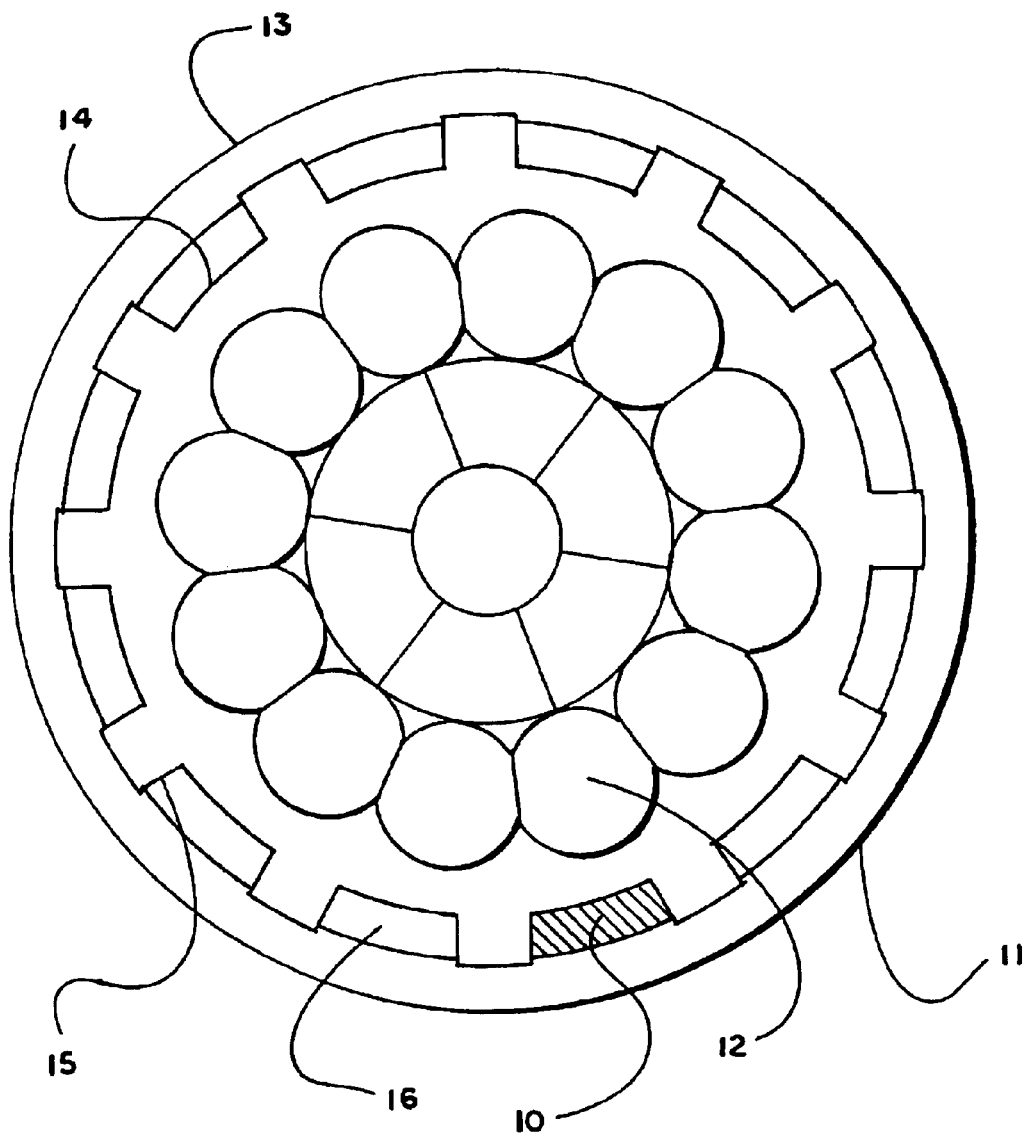
FIG. 2 is an end view of the embodiment of the cable shown in FIG. 1.

The cable 11 illustrated in FIG. 2 is an end view of the cable illustrated in FIG. 1.

Figure 3:
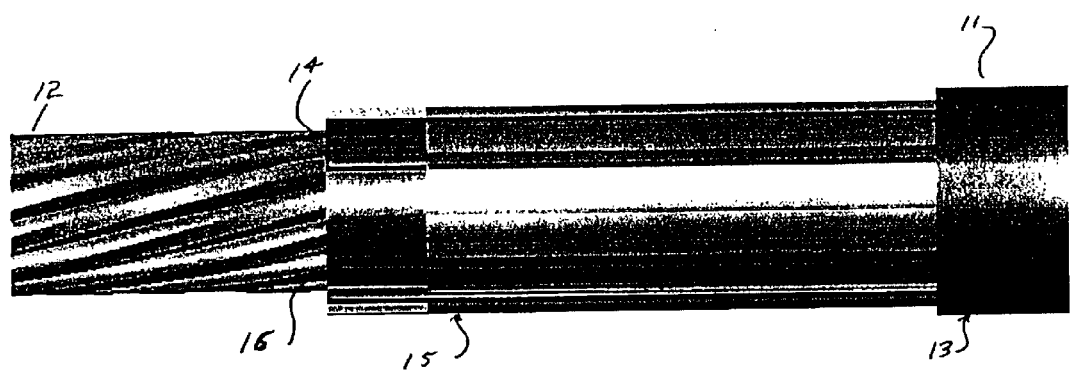
FIG. 3 is a cut-away side view of the cable shown in FIG. 1.

FIG. 3 is a cut-away side view of cable 11 shown in FIG. 1 and illustrates voids 16 and ribs or fins 15.

The ratio for the height of fins 15 to the width of voids 16 can vary. Advantageously, the height to width ratio ranges from about 0.25 to about 2.00. Preferably the height to width ratio ranges from about 0.5 to about 1.00. The fins do not have to be equally spaced but it is generally desirable to equally space the fins to achieve equal distribution of the medium that is in the channel regions, voids 16, and improve cable concentricity. The number of fins can range from a minimum of 2 up to any practical number that is needed based on the size of the cable, structural needs of the cable, the material being used in the voids, the delivery rate needed if applicable for the material, or the physical size of the material being delivered. The base thickness upon which the fins rest should not be less than about 50 percent of the width of the fins. The base thickness can vary based on thickness requirements of industry specifications, structural needs of the cable, or other specific cable needs.

The retaining mechanism between the outer encapsulating jacket or insulation and the fins can be a polymeric bond between the outer extruded layer 13 and the fins 15, or may be purely frictional. The frictional mechanism is due to the compressive forces, surface area, and frictional coefficient between the two layers. A material can be added during processing that increases the frictional coefficient between the two layers. If a polymeric bond is desired, it should constitute bonding of at least 50% of the exposed surface area of fins 15, i.e., the upper portion of the fins that contact the interior surface of the outer extended layer 13. Another retaining mechanism is similar to a shaft and a key, i.e., the upper portion of the fin is embedded into the outer encapsulating layer which helps prevent rotation of the inner layer or other movement. Advantageously the fin is embedded to a depth of at least about 0.001 inch into the interior of the outer insulation layer, preferably from about 0.002 inch to about 0.005 inch. The embedment can be varied by controlling different variables of the process. It is also possible to have combinations of polymeric, frictional, and embedded fin-retaining mechanisms between the two layers. Fins 15 may be attached to inner layer 14, outer layer 13, or both.

Materials that can be delivered in the channels in addition to sealing materials are fiber optics, heat transfer fluids to enhance cable heat transfer properties, other desirable materials that would provide a beneficial cable property or use the cable as a messenger to connect a beginning and/or end point.

The most desirable materials for use as the inner layer 14, fins 15, and outer encapsulating layer 13 are plastics that can be either thermoset or thermoplastic. Known plastic materials can be used in order to achieve desired cable properties.

The colors of the inner layer 14, fins 15, and outer layer 13 materials can be the same or they may differ. Different colors may be used to allow easier identification of the product in the field or for other desirable cable properties. The fins or ribs may be straight, may spiral, may oscillate about the axis of the cable, or may form different patterns depending on the desired cable characteristics and efficiency and flowability of the sealing material used.

It is to be understood that additional embodiments may include additional layers of protective material between the conductor and the insulation jacket, including an additional water barrier of a polymer sheet or film, in which case it is not essential that the jacket tightly enclose the layers there within or enter into the spaces between the wires and protective materials, i.e. the interior size of the jacket can be essentially equal to the exterior size of the elongated elements so that compression of the elongated elements, and hence, indentation of the layers there within including the insulation, is prevented.

The cable of the present invention is of particular advantage in that not only does the material fill the space between the inner layer and the insulation as the cable is manufactured, but after the cable is placed in service the material will flow into any cuts or punctures formed as a result of damage during handling and installation of the cable or its use in service. The stresses placed on the conductor and the insulation during handling and installation of the cable, such as bending, stretching, reeling and unreeling, striking with digging and installation equipment can form cuts or punctures in the insulation and between the insulation and the conductor. Such cuts or punctures can also be formed after the cable has been placed in service as a result of damage from adjacent utilities, homer owners, or lightening strikes.

The cable of the present invention can provide acceptable service even after the insulation has been cut or punctured, exposing the conductor. In order to determine the efficiency of using a self-sealing material defects were made in the insulation layer of two 600 V cable samples. On one of the cable samples, a layer of polyisobutene polymer was applied before application of the outer insulation layer of the cable. The other cable sample did not have the polyisobutene layer. Both cable samples were placed inside separate 1 liter glass beakers containing tap water. Each cable sample was energized at 110V to ground with AC current. The sample which did not have the polyisobutene layer exhibited severe corrosion overnight. The sample containing the polyisobutene layer exhibited no corrosion after being energized and submerged for 4 weeks in tap water in the glass beaker.

EXAMPLE 1

This test was designed to evaluate the performance of the present invention's self sealing, 600 V underground cable. The test program was patterned after a previously developed procedure to evaluate self-sealing or self-repairing cable designs.

To conduct the test damaged cables were placed in a specially mixed, moist soil. The cables were then energized with 120 V ac to ground. Measurements made included changes in leakage current to earth and cable conductor resistance. The temperature of each cable near the damage point was also monitored.

Four control sample replicates and eight self-sealing sample replicates were evaluated. All four control samples failed the test relatively early in the test program. All eight self-sealing samples performed well, with no significant increase in conductor resistance and low leakage current values throughout the 60-day test period.

Conventional and self-sealing 600 volt underground cable with a 2/0 AWG combination unilay aluminum conductor were tested in 10-foot lengths.

The soil used in the test was a mixture of Ottawa Sand, Wyo. Bentonite and fertilizer. The combination of the three materials provides a sandy-silt type soil, which is very conductive. The sand serves as the basic soil structure while the silt provides small particles that can work their way into the damaged areas of the cable. The silt also helps to keep water evenly dispersed throughout the soil. The fertilizer enhances the conductivity of the soil and may enhance corrosion as well. The goal was to achieve a soil electrical resistivity of <50 ohmmeters.

Tap water was used to achieve a moisture content near saturation. This combination of soil materials provides a worst case condition for the ac corrosion of the aluminum conductor in 600 V underground cables and is also repeatable from lab to lab.

The soil mixture was:
100 lbs. Ottawa Sand
3.33 lbs. Bentonite
23.33 lbs. Tap Water
1.26 lbs. of Peters 20-20-20 Plant Fertilizer (mixed with the water before added to the sand and clay ingredients)

The amount of water added achieved near saturation conditions. The wet density was approximately 127 lbs./ft.

The aging box was made of wood and lined with polyethylene to hold moisture. The approximate inside dimensions were 6.5 feet long by 1.3 feet wide by 1 foot high. A wide, copper tape ground electrode covered the bottom and sides of the box on top of the polyethylene. A wire connected this electrode to ground.

After moist soil was packed in the bottom of the box (approximately 6 inches), four control samples and eight self-sealing samples were installed, approximately six inches apart. The two sample sets were:

Samples 1–4: conventional 600 V UD wire (control samples) all with slot damage at the center of the sample
Samples 5–12: self-sealing cable—all with slot damage near the center of the sample Immediately before the samples were placed in the box, they were damaged down to the conductor. One damage condition was used. It consisted of a slot cut into the insulation down to the conductor, perpendicular to the cable axis. A razor knife and an angle guide was used to control the slot size. The size and shape of the damage location is shown in FIG. 4. The damage locations were staggered so they were not adjacent to each other.

The 10-foot long self-sealing samples were first damaged in the middle. After 5 minutes, they were placed in the box with the damage facing up. They were then covered with soil.

The control samples were initially 2.5-foot long. They were also damaged in the middle, then installed in the box. There was no waiting period before they were covered with soil.

As each sample was installed, a type T thermocouple with a welded bead was attached to the cable surface, approximately one inch from the damage location. Once all samples were installed, the soil was compacted. After 24 hours, the ends were cut off of the self-sealing samples so they were the same length as the control samples. The test layout is shown in FIG. 5.

After the installation was complete, the soil was covered with polyethylene to minimize the evaporation of water from the soil. 120 V ac was applied continuously to all sample conductors. The soil was grounded via the copper ground mat lining the tank. The data collection was as follows:

1) Measurements (Measured initially, then daily for first 5 workdays, then on Monday, Wednesday and Friday of each week thereafter.)
   a) Conductor resistance, each sample individually— Biddle DLRO, CQ # 1010 (Expected accuracy: ±3% of reading)
   b) Leakage to ground@120 V, each sample individually— Fluke 87, CN 4007 (Expected accuracy: ±3% of reading)
   c) Sample surface temperature—Yokaggawa DC100, CN 4015 (Expected accuracy: ±2 Deg. C)

2) The test ran for 91 days. When significant degradation occurred on a sample, it was disconnected from the voltage source. Significant degradation is defined as:
   a) Several days with leakage current greater than 1 amp on an individual sample
   b) Conductor resistance on an individual sample 10 times greater than starting resistance
3) Final soil electrical resistivity and moisture content was measured when the test was completed.
4) All measurements were recorded and resistance, leakage and temperature data were plotted using an Excel spreadsheet.

During the first 26 days of the test the conductor resistance and the leakage current into the soil increased significantly on all four control samples. They were each removed from the test (disconnected from the test voltage) as the conductor resistance exceeded 1,000 micro-ohms. The conductor resistance and the leakage current to the soil for the eight self-sealing samples did not change significantly during the test.

The soil electrical resistivity was measured at the end of the test by placing a sample of the soil in a 17-inch long, 2-inch inside diameter PVC tube. It was packed to the same density used in the test tank. Two-inch diameter copper plate electrodes were pressed against the soil on each end of the tube. 120 volts ac was applied across the electrodes and the resulting current was measured. The current and voltage were used to calculate the sample resistance, which was then converted to resistivity.

Moisture content and density were measured at the beginning and end of the test. To make the measurement, a soil sample was taken using a 1/30 cubic foot metal shelby tube. The sample was then oven dried to calculate moisture and density. The measured weights were used to calculate moisture content. Soil resistivity, moisture and density measurements are summarized in Table 1.

TABLE 1

| Time of Measurement | Electrical Resistivity (ohm-meters) | Moisture Content (% by weight) | Wet Density (lbs./ft³) |
|---|---|---|---|
| Initial | 4.3 | near saturation | 126 |
| Final | 5.1 | 15.8 | 126 |

The insulation resistance, conductor resistance and sample temperature measurements made during the test are shown in FIGS. 6–8. The samples are identified as S1, S2, S3, etc. The first four are control, the remaining eight are self-sealing. In addition, C=Control, SS=Self-Sealing.

During periods of relatively high leakage current on the control samples the temperature of these samples was also relatively high. Photos of the samples under test are shown in FIGS. 5, 6 and 7. From the photos it is obvious that the control samples experienced significant corrosion while the self-sealing samples experienced no noticeable corrosion.

EXAMPLE 2

A cyclic load test was run on the finned cable of the present invention and compared with similar non-finned prior art cables. 50 ft. samples were tested. The samples had a 50° C. conductor temperature, and were cycled on 8 hours a day and off 16 hours, 7 days a week. The cables were terminated with a mechanical connector. No duct seal, mastic tape, electrical tape, or the like was used. The tops of the samples were approx. 11 ft. above the floor. The samples gradually droop to the floor.

Sample 1 (Invention)

| Weeks of Aging | Shrinkback at Top | Shrinkback at Bottom | Total Shrinkback (in) |
|---|---|---|---|
| Initial | .0000 | .0000 | .0000 |
| 1 | .3035 | .1510 | .4545 |

Sample 2 (Invention)

| Weeks of Aging | Shrinkback at Top | Shrinkback at Bottom | Total Shrinkback (in) |
|---|---|---|---|
| Initial | .0000 | .0000 | .0000 |
| 1 | .1385 | .1880 | .3265 |

Sample 1 Bare (Prior Art)

| Weeks of Aging | Shrinkback at Top | Shrinkback at Bottom | Total Shrinkback (in) |
|---|---|---|---|
| Initial | .8450 | .2220 | 1.0670 |
| 1 | 4.6375 | 1.2010 | 5.8385 |
| 2 | 5.5390 | .8220 | 6.3610 |
| 3 | 5.9350 | .6735 | 6.6085 |
| 4 | 6.1110 | .6150 | 6.7260 |
| 5 | 5.9065 | .5850 | 6.4915 |
| 6 | 6.3725 | .6020 | 6.9745 |
| 7 | 6.2960 | .7320 | 7.0280 |
| 8 | 6.4500 | .5340 | 6.9840 |
| 9 | 6.6855 | .4350 | 7.1205 |

Sample 2 Duct Seal (Prior Art)

| Weeks of Aging | Shrinkback at Top | Shrinkback at Bottom | Total Shrinkback (in) |
|---|---|---|---|
| Initial | .2205 | .2555 | 0.4760 |
| 1 | 3.1345 | 2.7980 | 5.9325 |
| 2 | 3.7155 | 2.7255 | 6.4410 |
| 3 | 4.7570 | 2.0195 | 6.7765 |
| 4 | 5.1600 | 1.5315 | 6.6915 |
| 5 | 5.4965 | 1.2150 | 6.7115 |
| 6 | 5.7300 | 1.1115 | 6.8415 |
| 7 | 5.6915 | 1.2420 | 6.9335 |
| 8 | 6.0065 | 1.0395 | 7.0460 |
| 9 | 6.1285 | .8860 | 7.0145 |

Sample 3 Mastic Tape (Prior Art)

| Weeks of Aging | Shrinkback at Top | Shrinkback at Bottom | Total Shrinkback (in) |
|---|---|---|---|
| Initial | .2270 | .2195 | 0.4465 |
| 1 | 3.6490 | 1.6500 | 5.2990 |
| 2 | 3.5330 | 2.0550 | 5.5880 |
| 3 | 4.0990 | 1.6900 | 5.7890 |
| 4 | 4.3685 | 1.5315 | 5.9000 |
| 5 | 4.4675 | 1.4650 | 5.9325 |
| 6 | 4.6870 | 1.3660 | 6.0530 |
| 7 | 4.6605 | 1.3435 | 6.0040 |
| 8 | 4.7635 | 1.2190 | 5.9825 |
| 9 | 4.9370 | 1.0500 | 5.9870 |

Over 80% of the total shrinkback of the prior art cable occurred in the first week of testing.

Comparative results with the present invention show a dramatic reduction in shrinkback after 1 week of testing. The reduction is more than 92% when compared with the prior art.

Although preferred embodiments of the present invention have been described and illustrated, it will be apparent to those skilled in the art that various modifications may be made without departing from the principles of the invention.

What is claimed is:

1. An electrical cable comprising a conductor, an inner layer of material having a plurality of outwardly longitudinally extending fins around said conductor, an outer insulation layer, the interior of the outer insulation layer at least partly contacts the fins' upper portions, and a material between the inner layer and the outer insulation layer which provides self-sealing properties to the cable, wherein the fins have a ratio of height to width of from about 0.25 to about 2.0 and said material providing self-sealing properties is a dielectric.

2. The electrical cable of claim 1 wherein the conductor is formed by a plurality of wires stranded together.

3. The electrical cable of claim 1 wherein the fins have a ratio of height to width of from about 0.5 to about 1.00.

4. The electrical cable of claim 1 wherein the fins are equally spaced about the circumference of the inner layer.

5. The electrical cable of claim 1 wherein the fins are irregularly spaced about the circumference of the inner layer.

6. The electrical cable of claim 1 having at least 2 fins.

7. The electrical cable of claim 1 wherein a portion of each fin is attached to the inner layer by at least 50% of the total width of the fin.

8. The electrical cable of claim 1 wherein a portion of each fin is attached to the interior of the outer insulation layer.

9. The electrical cable of claim 8 wherein the portion of each fin is attached to the interior of the outer insulation layer by an attachment mechanism selected from the group consisting of a polymeric bond, a frictional bond, embedment of the fins into the interior of the outer insulation layer, and combinations thereof.

10. The electrical cable of claim 9 wherein the portion of each fin is attached to the interior of the outer insulation layer by embedment of the fins into the interior of the outer insulation layer to a depth of at least about 0.001 inch.

11. The electrical cable of claim 10 wherein the portion of each fin is attached to the interior of the outer insulation layer by embedment of the fins into the interior of the outer insulation layer to a depth of from about 0.002 to about 0.005 inch.

12. The electrical cable of claim 9 wherein the attachment mechanism is a polymeric bond and said bond is between at least 50% of the width of the attached portion of the fin and the interior of the outer insulation layer.

13. The electrical cable of claim 1 wherein the fins are longitudinally substantially straight.

14. The electrical cable of claim 1 wherein the fins substantially form a longitudinal spiral.

15. The electrical cable of claim 1 wherein the fins are substantially oscillatory about the axis of the cable.

16. The electrical cable of claim 1 wherein said material is flowable at about 25° C.

17. The electrical cable of claim 1 wherein said material has a 100 gram needle penetration value greater than 100 tenths of a millimeter at 25° C.

18. The electrical cable of claim 17 wherein said material is a polymeric material.

19. The electrical cable of claim 18 wherein said material is an isomer.

20. The electrical cable of claim 19 wherein said material is polyisobutene.

21. A method of making an insulated electrical cable which mitigates the effects of voids, punctures, or cracks formed in the insulation prior to installation of the cable, during the installation of the cable, and after the cable is placed in service comprising the steps of:
 (a) forming a conductor;
 (b) applying an inner layer of material on the exterior of the conductor, said inner layer having a plurality of outwardly extending fins;
 (c) applying a material which provides self-sealing properties in the voids between the inner layer fins; and
 (d) forming an outer insulation layer encircling and enclosing the conductor, inner layer, and material having self-sealing properties by contacting the upper portion of the fins.

22. The method of claim 21 wherein steps (b) and (c) are performed in one pass.

23. The method of claim 21 wherein steps (b), (c), and (d) are performed in one pass.

24. The method of claim 21 wherein steps (b), (c), and (d) are performed in tandem.

25. The method of claim 21 wherein steps (a), (b), (c), and (d) are performed in tandem.

26. The method of claim 21 wherein steps (b), (c), and (d) are performed in sequence.

27. The method of claim 21 wherein the conductor is formed by a plurality of wires stranded together.

28. The method of claim 21 wherein the upper portion of the fins are attached to the interior of the outer insulation layer.

29. An electrical cable produced by the method of claim 21 having, per 50 feet of cable, initially less than about 0.2 inch shrinkback of the inner and outer layers after performing a complete circular cut of said layers.

30. An electrical cable produced by the method of claim 21 having, per 50 feet of cable, less than about 0.5 inch shrinkback of the inner and outer layers subsequent to accomplishing a complete circular cut of said layers and aging for one week.

31. An electrical cable comprising a conductor, an inner layer of material around said conductor, an outer insulation layer, and a plurality of longitudinally extending fins, between said inner layer and said outer layer, the interior of the outer insulation layer at least partly contacts the fins' upper portions, and a material between the inner layer and the outer insulation layer which provides self-sealing properties to the cable, wherein the fins have a ratio of height to width of from about 0.25 to about 2.0 and said material providing self-sealing properties is a dielectric which is flowable at about 25° C.

32. The electrical cable of claim 31 wherein a portion of each fin is attached to the inner layer.

33. The electrical cable of claim 31 wherein a portion of each fin is attached to the interior of the outer insulation layer.

34. The electrical cable of claim 31 wherein a portion of each fin is attached to the inner layer and a portion of each fin is attached to the outer layer.

35. A method of making an insulated electrical cable which mitigates the effects of voids, punctures, or cracks formed in the insulation prior to installation of the cable, during the installation of the cable, and after the cable is placed in service comprising the steps of:

(a) forming a conductor;
(b) applying an inner layer of material on the exterior of the conductor;
(c) forming a plurality of fins extending longitudinally and adjacent to said inner layer;
(d) applying a material which provides self-sealing properties in voids between the longitudinally extending fins; and
(e) forming an outer insulation layer encircling and enclosing the conductor, inner layer, and material having self-sealing properties by contacting the upper portion of the fins.

36. The method of claim 35 wherein said material having self-sealing properties is a dielectric flowable at about 25° C.

* * * * *